(12) United States Patent
Shan et al.

(10) Patent No.: US 11,605,174 B2
(45) Date of Patent: Mar. 14, 2023

(54) DEPTH-OF-FIELD SIMULATION VIA OPTICAL-BASED DEPTH EXTRACTION

(71) Applicant: Black Sesame International Holding Limited, Santa Clara, CA (US)

(72) Inventors: Jizhang Shan, Los Gatos, CA (US); Tiecheng Wu, Singapore (SG); Bo Li, Singapore (SG); Jin Xu, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 230 days.

(21) Appl. No.: 17/110,570

(22) Filed: Dec. 3, 2020

(65) Prior Publication Data

US 2022/0180544 A1 Jun. 9, 2022

(51) Int. Cl.
*G06T 5/00* (2006.01)
*G06T 7/571* (2017.01)
(Continued)

(52) U.S. Cl.
CPC ............. *G06T 7/571* (2017.01); *G06T 5/002* (2013.01); *G06T 5/20* (2013.01); *G06T 5/50* (2013.01);
(Continued)

(58) Field of Classification Search
CPC ........... G06T 7/571; G06T 5/002; G06T 5/20; G06T 5/50; G06T 7/11; G06T 2207/20192; G06T 2207/20212; G06T 7/55; G06T 5/007; G06T 2207/10028; G06T 2207/20024; G06T 7/174; G06T 7/194; G06T 7/50; G06T 2200/21; G06T 2207/10004; G06T 7/40; G06T 7/97; G06T 3/4046; G06T 9/002; G06T 2207/20081; G06T 2207/20084; G06K 9/6272; G06K 9/627; G06K 7/1482; H04N 2213/003; H04N 2213/005; H04N 5/2226; H04N 2013/0081; H04N 13/128; H04N 13/271; G06V 10/467; G06V 10/25;
(Continued)

(56) References Cited

U.S. PATENT DOCUMENTS

10,217,195 B1 * 2/2019 Agrawal .................. G06T 7/11
2012/0249836 A1 * 10/2012 Ali ....................... H04N 5/2621
348/E5.051
(Continued)

*Primary Examiner* — Jose L Couso
(74) *Attorney, Agent, or Firm* — Timothy T. Wang; Ni, Wang & Massand, PLLC (57) ABSTRACT

A method of depth-of-field simulation, including receiving a plurality of images, predicting a layer of interest mask of the plurality of images, determining a plurality of mean brightness anchor values of a respective plurality of layers of interest window arrays, setting a plurality of layers of interest set of binary codes, determining a hamming distance between plurality of layers of interest set of binary codes, determining a cost volume based on the hamming distance, resampling a vertical cost based on a vertical ordinal direction the cost volume, resampling a horizontal cost based on a horizontal ordinal direction the cost volume, determining an all-in-focus layer based on the vertical cost and the horizontal cost, determining an out-of-focus layer based on the vertical cost and the horizontal cost and determining a depth of the all-in-focus layer and out-of-focus layer.

16 Claims, 8 Drawing Sheets

(51) Int. Cl.
*G06T 7/11* (2017.01)
*G06T 5/20* (2006.01)
*G06T 5/50* (2006.01)

(52) U.S. Cl.
CPC ...... *G06T 7/11* (2017.01); *G06T 2207/20192* (2013.01); *G06T 2207/20212* (2013.01)

(58) Field of Classification Search
CPC .......... G06V 30/19013; G06V 10/454; G06V 10/82; G06V 30/18057; G06N 3/02; G06N 3/08–088; G06N 3/0454; G06N 7/00; G06N 20/00
See application file for complete search history.

(56) References Cited

U.S. PATENT DOCUMENTS

| | | | |
|---|---|---|---|
| 2013/0071028 A1* | 3/2013 | Schiller | G06T 7/11 382/180 |
| 2014/0267243 A1* | 9/2014 | Venkataraman | G06T 7/557 345/419 |
| 2021/0042950 A1* | 2/2021 | Wantland | G06T 5/005 |
| 2021/0104014 A1* | 4/2021 | Kolb, V | G06T 5/20 |
| 2021/0142497 A1* | 5/2021 | Pugh | G06T 7/90 |
| 2021/0256680 A1* | 8/2021 | Xie | G01S 17/89 |
| 2022/0006998 A1* | 1/2022 | Busam | G06T 5/50 |
| 2022/0156887 A1* | 5/2022 | Lin | G06T 5/002 |

* cited by examiner

DEPTH-OF-FIELD SIMULATION VIA OPTICAL-BASED DEPTH EXTRACTION

BACKGROUND

Technical Field

The instant disclosure is related to depth-of-field simulation and specifically to providing depth-of-field simulation via optical-based depth extraction.

Background

Currently, mobile phone cameras have become a predominant method in taking photographs over previous digital single lens reflex (DSLR) cameras. The imaging quality of mobile phone cameras may be considered inferior to digital single lens reflex (DSLR) cameras due in large pan to the difference between DSLR and mobile phone camera the depth of field (DOF). DSLR cameras are equipped with lens having a large focal distance which naturally blurs out-of-focus areas and draws a viewer's attention to the subject of the image. Currently, mobile phones capture images with a pin-hole like camera which preserves high frequency components in background, thus, making the photograph less appealing.

SUMMARY

An example method of depth-of-field simulation, including receiving a first image, receiving a second image, predicting a layer of interest mask of the first image, determining a first mean brightness anchor value of a first window array of the layer of interest mask, determining a second mean brightness anchor value of a second window array of the layer of interest mask, setting a first set of binary codes of the first window array, setting a second set of binary codes of the second window array, determining a hamming distance between the first set of binary codes and the second set of binary codes, determining a cost volume based on the hamming distance, resampling a vertical cost based on a vertical ordinal direction the cost volume, resampling a horizontal cost based on a horizontal ordinal direction the cost volume, determining an all-in-focus layer based on the vertical cost and the horizontal cost, determining an out-of-focus layer based on the vertical cost and the horizontal cost and determining a depth of the all-in-focus layer and out-of-focus layer.

Another method of depth-of-field simulation, including receiving an initial cost volume of a first image, determining a layer of interest mask of the first image, determining the layer of interest mask mean cost volume as a layer of interest, partitioning the layer of interest mask from a remaining layer, edge filtering the layer of interest mask, smooth filtering the remaining layer and recombining the edge filtered layer of interest mask and the smooth filtered remaining layer.

A further method of depth-of-field simulation, including receiving a plurality of images, predicting a layer of interest mask of the plurality of images, determining a plurality of mean brightness anchor values of a respective plurality of layers of interest window arrays of the layer of interest mask within the respective plurality of images, setting a plurality of layers of interest set of binary codes of the respective plurality of layers of interest window arrays, determining a hamming distance between plurality of layers of interest set of binary codes of the respective plurality of layers of interest window arrays, determining a cost volume based on lire hamming distance, resampling a vertical cost based on a vertical ordinal direction the cost volume, resampling a horizontal cost based on a horizontal ordinal direction the cost volume, determining an all-in-focus layer based on the vertical cost and the horizontal cost, determining an out-of-focus layer based on the vertical cost and the horizontal cost and determining a depth of the all-in-focus layer and out-of-focus layer.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the an will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
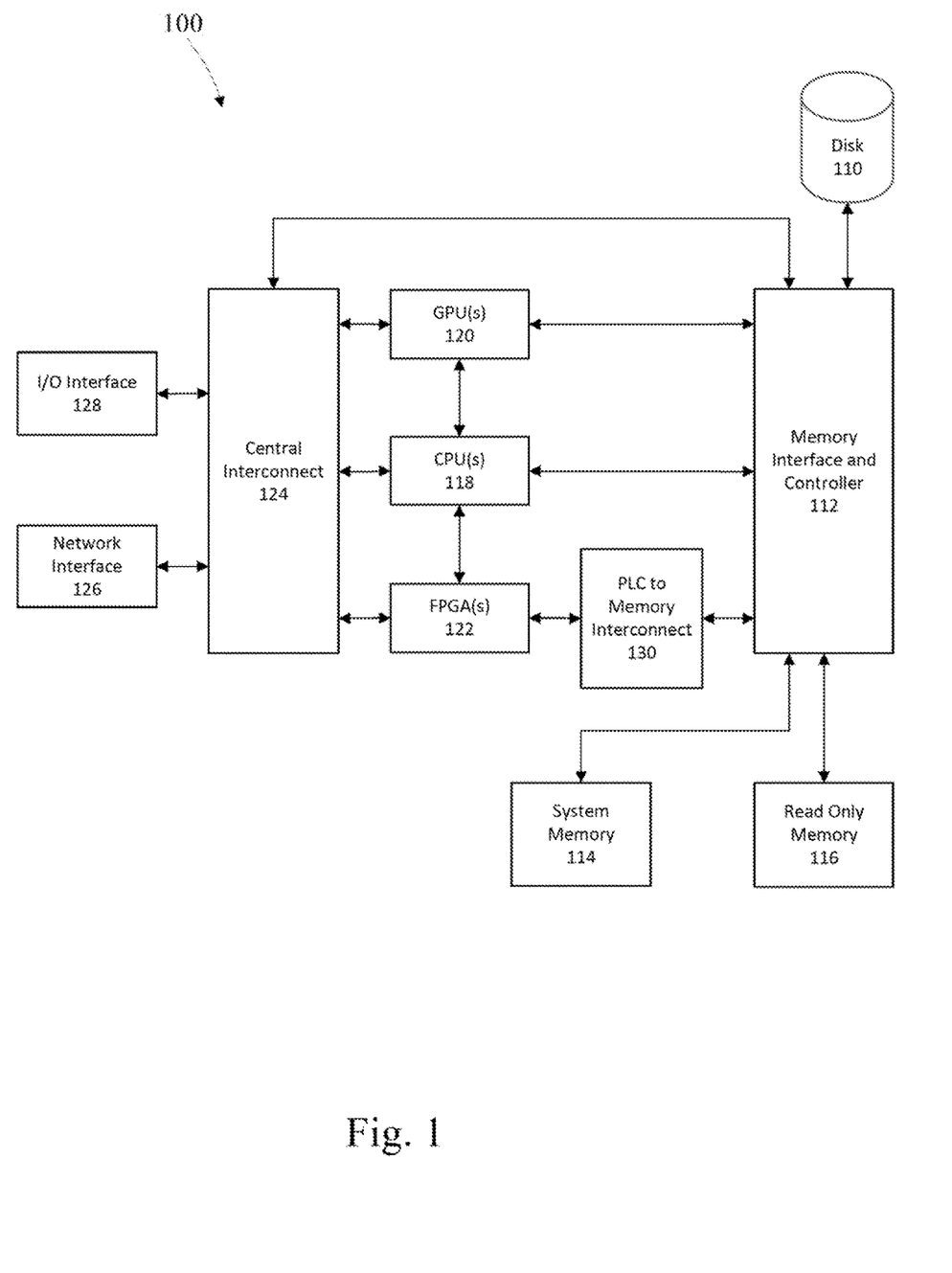
FIG. 1 is a first example system diagram in accordance with one embodiment of the disclosure.
Figure 6:
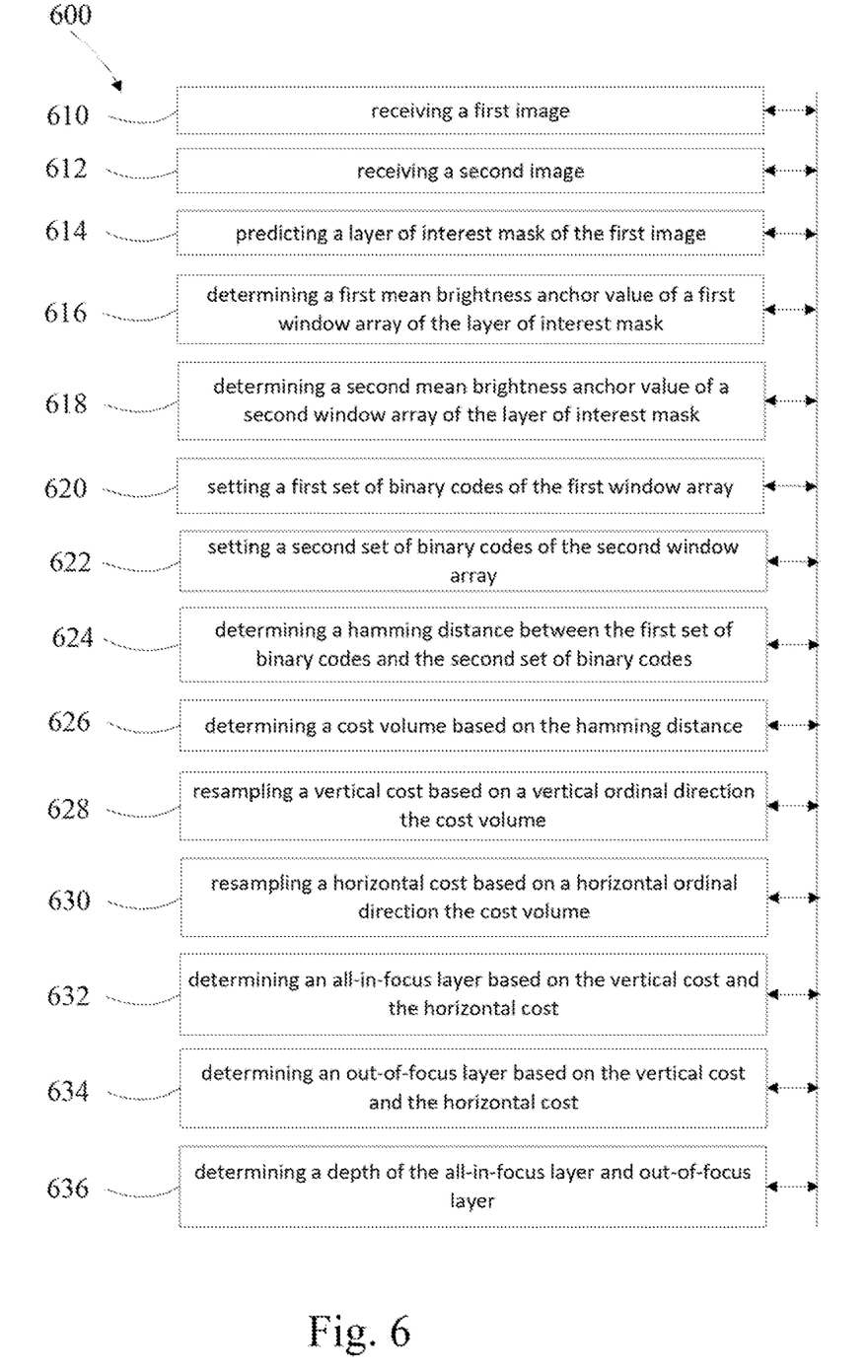
FIG. 6 is a first example method in accordance with one embodiment of the disclosure.
Figure 7:
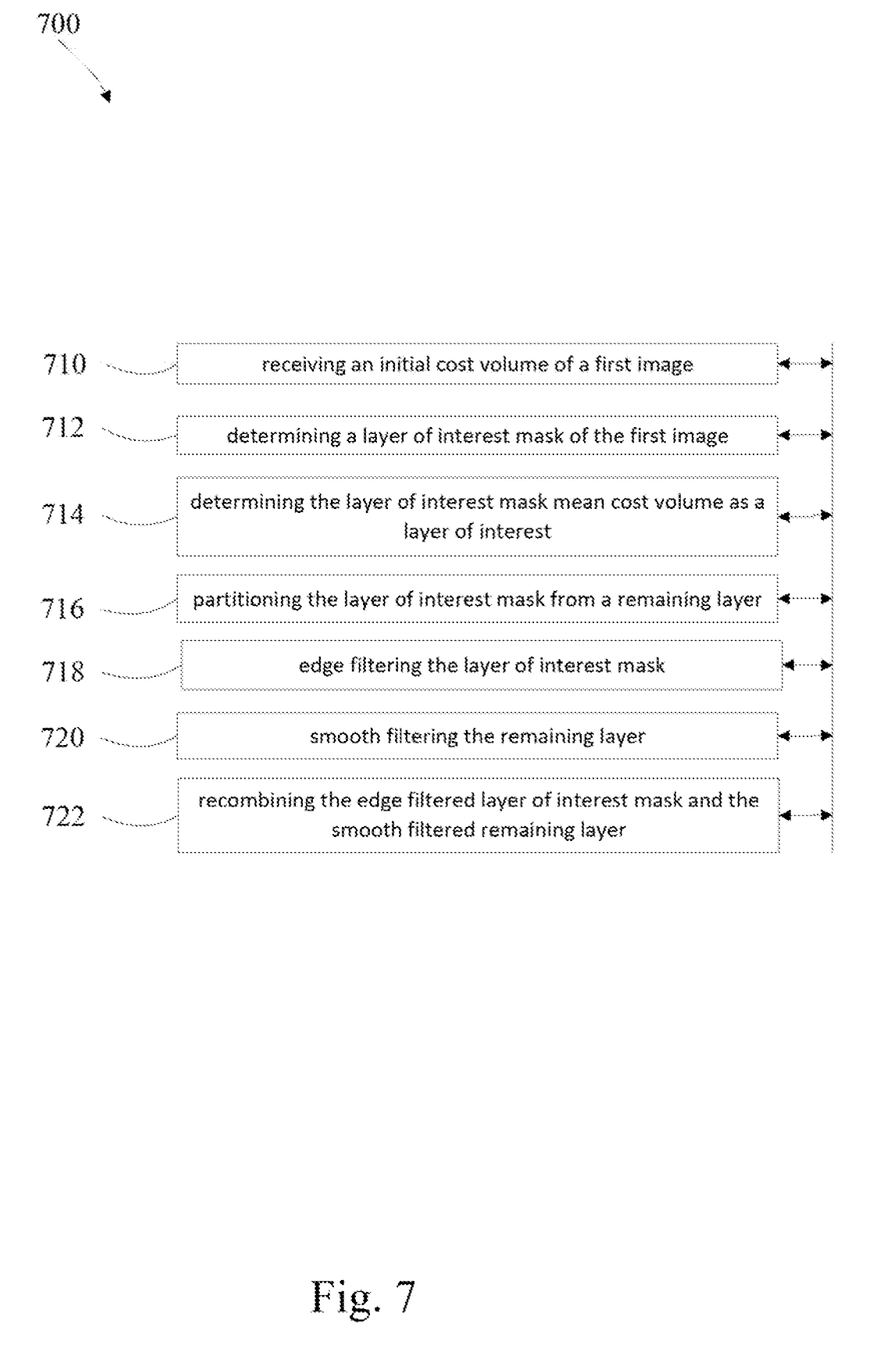
FIG. 7 is a second example method in accordance with one embodiment of the disclosure.
Figure 8:
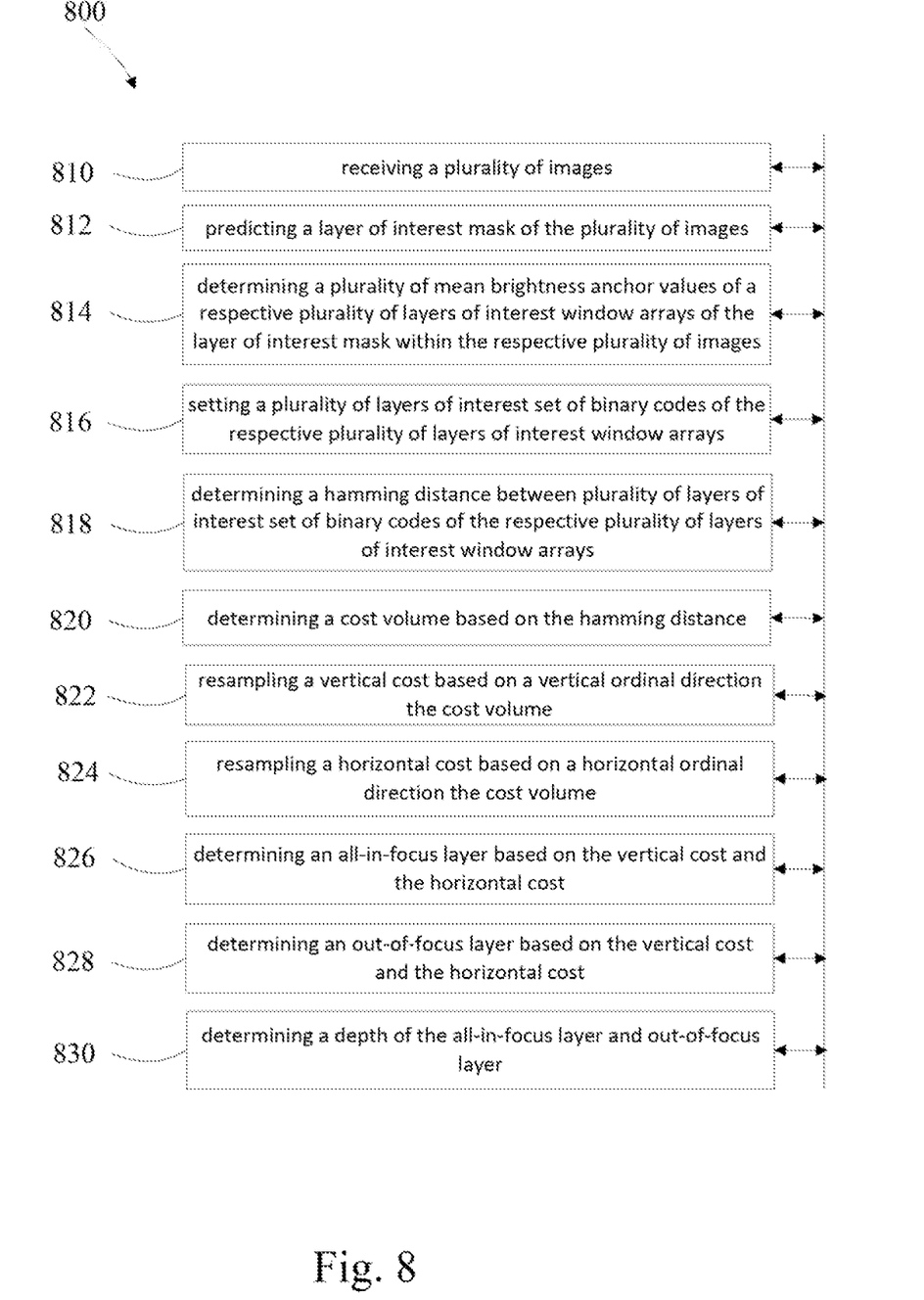
FIG. 8 is a third example method in accordance with one embodiment of the disclosure.

FIG. 1 depicts an example hybrid computational system 100 that may be used to implement neural nets associated with the operation of one or more portions or steps of the processes depicted in FIGS. 6-8. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited.

A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical dam processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions welt with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
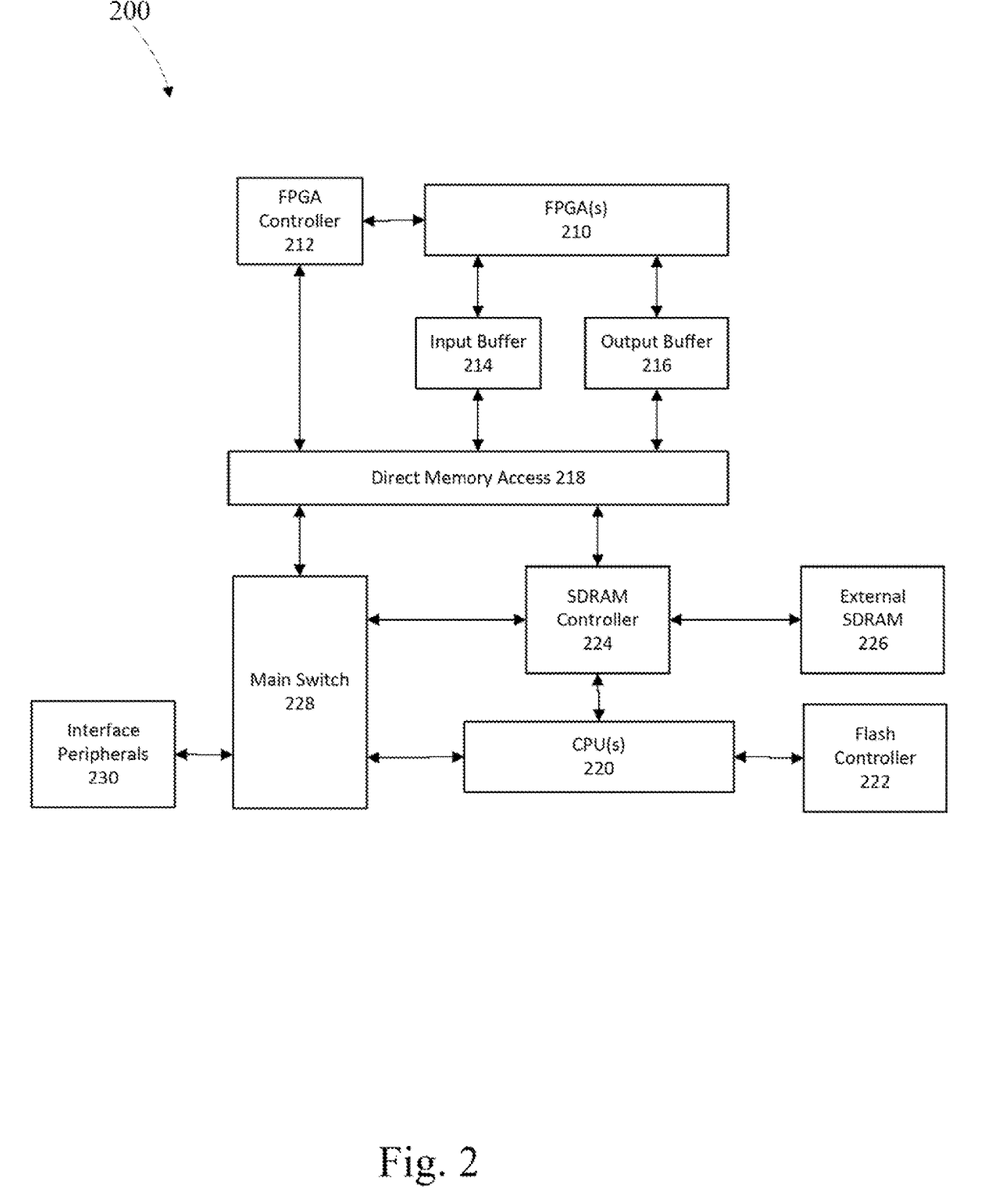
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

To enable a mobile camera to simulate the depth of field of a DSLR two horizontally placed cameras may be utilized. When a shutter is pressed, two images may be taken simultaneously, as the images are rectified, a pixel in the left image would have a counterpart in the right image along a horizontal line, i.e. the epi-polar line. The displacement of the corresponding pixels, termed disparity, in the two images is inversely proportional to the distance of the object from the camera. Utilizing the disparity of the pixels, a depth of the objects captured in the scene may be found, which in turn may be used to find a point spread kernel function of each pixel in a simulated DSLR image. By applying the point spread function as a post-processing method, it may be possible to simulate images having a DSLR-like depth of field with high fidelity.

Currently, disparities may be estimated via a comparison of the color of the left pixel and the right pixels along the epipolar line utilizing a minimization function. The depth map produced by a simple color difference minimization technique may provide images with inferior noise and color properties.

Current cost volume construction methods allow a color bias between two cameras to negatively affect image quality by causing a significant deterioration of the depth map. In this case when the two cameras have systematic color bias, which may occur in mobile devices, the resultant depth map would deteriorate significantly.

Another negative influence of current cost volume construction methods may be due to misaligned camera sensors. Various image filtering techniques have been employed to extract features in small windows to minimize differences in illumination and color variance such as those which utilize image gradient information for cost volume determination. Filtering utilizing image gradient information within small windows slows image processing significantly.

Other current cost volume construction methods aggregate the volume assuming that averaging the cost of pixels with the same depth reduces noises and improves accuracy, but these techniques have significant drawbacks. Box filtering leads to loss of details and fine structures in all-in-focus regions. Bilateral filtering leads to excessive segmentation of background regions, thus giving rise to rendering artifacts along with a significant slowing of image processing.

A proposed solution to constructing cost volume includes quantified cross correlation, which may be invariant to color bias and illumination bias and the application of different filters to different layers of the cost volume, based on an estimation of the depth of the all-in-focus region.

Quantified cross correlation determines a mean brightness over a small window to serve as an anchor value. The raw brightness values in surrounding small windows may be compared with the anchor value. The comparison result may be coded in a binary string, with values greater than the anchor value, being coded as a one (1) and values less than the anchor value being coded as zero (0). In this way, surrounding pixels in the stereo pair may be described as an eight (8) bit binary.

Utilizing quantified cross correlation, a cost volume may be determined by finding the hamming distance between the binary codes of a left image pixel and a right image pixel along an epipolar line for that layer.

Currently, cost volume complexity may be driven by the size of the input image and once found is rarely resampled so as not to invalidate the previously determined disparity values. In the proposed solution only ordinal information of the cost volume may be resampled, as the absolute physical depth may have a limited impact on the final result. Thus, in the proposed solution the cost volume may be resampled along the horizontal and vertical dimension while leaving the depth dimension intact. This cost volume resampling preserves the depth resolution.

The depth of the all-in-focus region may be found prior to the depth map of the entire image. For example, to refocus the optical system of the mobile device, the system may query users to indicate an area and or subject to be all-in-focus. By determining the depth of the indicated area, the layers of interest may be determined. In another example, a deep learning segmentation model may predict the probable area or subject of interest. Aggregating the cost volume within the mask, the disparity value with the minimum overall cost may indicate the layer or layers of interest. In another example, the user may place the subject of interest within a specific depth range, so that the layers of interest may be fixed.

The rendering of a depth of field for the all-in-focus region allows the spatial resolution to preserve details and fine structures, and the rendered depth map of the out-of-focus regions should be smooth in the spatial domain so that the resulting image has a natural appearance.

Figure 3:
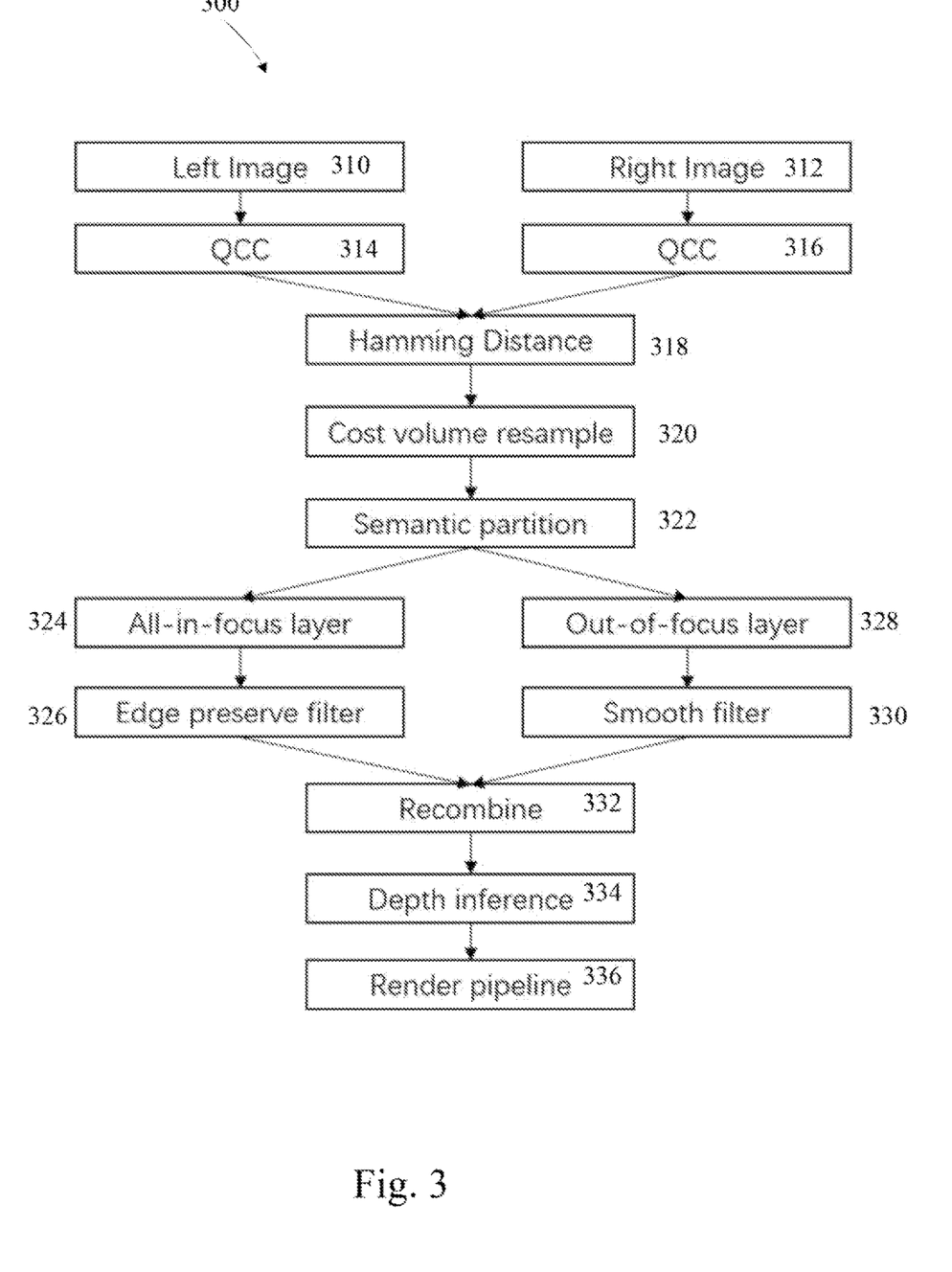
FIG. 3 is an example method workflow in accordance with one embodiment of the disclosure.

FIG. 3 depicts an example overall workflow 300. A left (first) image 310 and right (second) image 312 undergo a quantified cross correlation 314, 316. A Hamming distance is determined 318, a cost volume is resampled 320 and a semantic partitioning 322 is performed. The semantic partitioning allows the image to be separated into all-in-focus layers 324 and out-of-focus layers 328 which would replicate the focus of a DSLR. The all-in-focus layers may be filtered 326 with an edge preserve filter to keep sharp edges. The out-of-focus layers may be filtered 330 with a smoothing filter in conjunction with the semantic partitioning to allow a natural out-of-focus portion of the image. The filtered all-in-focus layers and the filtered out-of-focus layers may be recombined 332 and a depth inference 334 is performed, the resultant image is then rendered 336.

Figure 4:
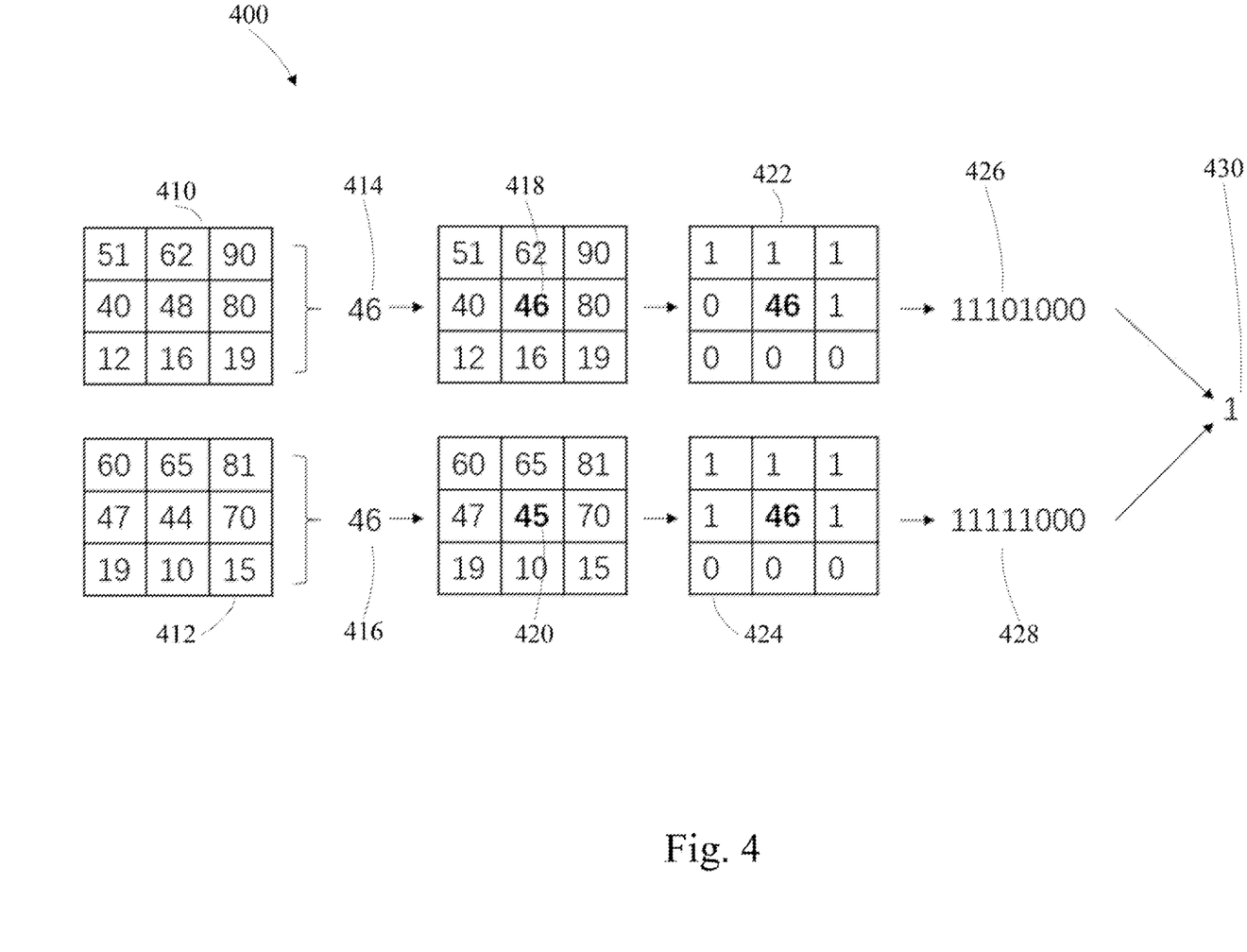
FIG. 4 is an example qualified cross correlation workflow in accordance with one embodiment of the disclosure.

FIG. 4 depicts an example quantified cross correlation 400. If the array 410 is the left image window and array 412 is the right image window, the average of the cells within array 410 and array 412 is 46, given by 414 and 416. If the average is placed in the center of each of the arrays, 418 and 420, then a determination may be made whether each of the surrounding cells is less than or greater than the average in the center cell. If a surrounding cell has an original value greater than the average, that cell is refilled with a one (1), if the original value is less than the average, that cell is refilled with zero (0). When the average center is removed, the remaining eight (8) values indicate the quantified cross correlation for that window. A hamming distance 430 may be determined from the two quantified cross correlations 426 and 428.

Distinct aggregation strategies may be utilized for different Layers of interest. Edge preserving fillers such as a bilateral filter, a guided filter or a domain transform filter may be applied to delineate fine details. In the layers of out-of-focus depths, the cost volume may be separated and spatially down sampled. The subsample process may reduce subsequent post processing as the horizontal and vertical dimensions may be reduced and depth resolution may be maintained as no subsample is performed in the disparity dimension. A smoothing filter may be applied. If fine detail is sought after, bilateral filtering of large spatial and color sigma may be applied. Optionally, similar operations may be applied in the disparity dimension to facilitate enhanced the depth resolution. The cost volumes may be recombined to form an aggregated cost volume from which the final depth map may be determined.

One possible solution for a depth of field simulation may include a cost volume construction, decoupling of the spatial and depth domain and resampling of the cost volume. The depth of an all-in-focus region may be estimated and used to separate the cost volume into layers of interest and out-of-focus layers. An adaptive treatment of the components may be performed prior to recombination and final depth determination.

Figure 5:
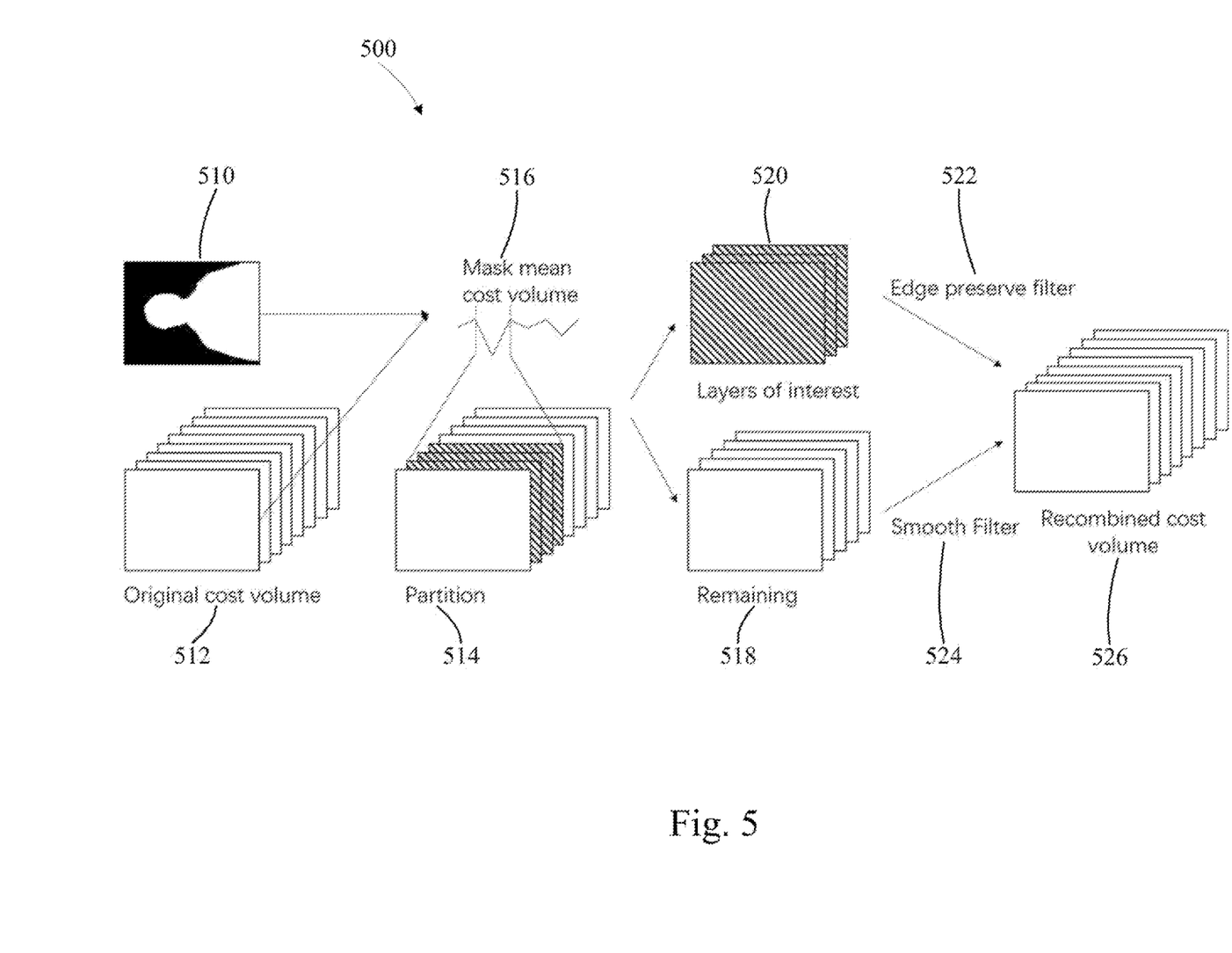
FIG. 5 is another example cost volume partition and adaptive aggregation in accordance with one embodiment of the disclosure.

FIG. 5 depicts an example cost volume partition and adaptive aggregation 500. In this example an image is input, and a mask 510 is created for a region of interest. An original cost volume 512 and the mask may be utilized to partition 514 the original cost volume based on a mask mean cost volume 516. The partition separates out the cost volume into layers of interest 520 which will be all-in-focus and the remaining layers 518 which will be out-of-focus. An edge preserve filler 522 is utilized on the all-in-focus layers of interest and a smoothing filter 524 is utilized on the out-of-focus remaining layers. The filtered layers of interest and the filtered remaining layers may be recombined 526 into a recombined cost volume.

FIG. 6 depicts an example method of depth-of-field simulation 600, including receiving 610 a first image, receiving 612 a second image, predicting 614 a layer of interest mask of the first image, determining 616 a first mean brightness anchor value of a first window array of the layer of interest mask and determining 618 a second mean brightness anchor value of a second window array of the layer of interest mask. The method also includes setting 620 a first set of binary codes of the first window array, setting 622 a second set of binary codes of the second window array, determining 624 a hamming distance between the first set of binary codes and the second set of binary codes and determining 626 a cost volume based on the hamming distance. The method further includes resampling 628 a vertical cost based on a vertical ordinal direction the cost volume, resampling 630 a horizontal cost based on a horizontal ordinal direction the cost volume, determining 632 an all-in-focus layer based on the vertical cost and the horizontal cost, determining 634 an out-of-focus layer based on the vertical cost and the horizontal cost and determining 636 a depth of the all-in-focus layer and out-of-focus layer.

The method may include semantic partitioning of the cost volume, edge filtering the all-in-focus layer and smooth filtering the out-of-focus layer. The method may also include recombining the edge filtered all-in-focus layer and the smooth filtered out-of-focus layer, decoupling a spatial domain and a depth domain of the first image and the second image, estimating an all-in-focus depth of the all-in-focus layer and segregating the all-in-focus layer and the out-of-focus layer.

FIG. 7 depicts another example method of depth-of-field simulation 700, including receiving 710 an initial cost volume of a first image, determining 712 a layer of interest mask of the first image and determining 714 the layer of interest mask mean cost volume as a layer of interest. The method further includes partitioning 716 the layer of interest mask from a remaining layer, edge filtering 718 the layer of interest mask, smooth filtering 720 the remaining layer and recombining 722 the edge filtered layer of interest mask and the smooth filtered remaining layer. The method may also include determining a final depth map of the recombination.

FIG. 8 depicts a further example method of depth-of-field simulation 800, including receiving 810 a plurality of images, predicting 812 a layer of interest mask of the plurality of images, determining 814 a plurality of mean brightness anchor values of a respective plurality of layers of interest window arrays of the layer of interest mask within the respective plurality of images and setting 816 a plurality of layers of interest set of binary codes of the respective plurality of layers of interest window arrays. The method includes determining 818 a hamming distance between plurality of layers of interest set of binary codes of the respective plurality of layers of interest window arrays, determining 820 a cost volume based on the hamming distance, resampling 822 a vertical cost based on a vertical ordinal direction the cost volume and resampling 824 a horizontal cost based on a horizontal ordinal direction the cost volume. The method also includes determining 826 an all-in-focus layer based on the vertical cost and the horizontal cost, determining 828 an out-of-focus layer based on the vertical cost and the horizontal cost and determining 830 a depth of the all-in-focus Layer and out-of-focus layer.

The method may also include semantic partitioning of the cost volume, edge filtering the all-in-focus layer and smooth filtering the out-of-focus layer. The method may include recombining the edge filtered all-in-focus layers and the smooth filtered out-of-focus layers, decoupling a spatial domain and a depth domain of the first image and the second image, estimating an all-in-focus depth of the all-in-focus layers and segregating the all-in-focus layers and the out-of-focus layers.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over oilier aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment,"+"an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of depth-of-field simulation, comprising:
receiving a first image;
receiving a second image;
predicting a layer of interest mask of the first image;
determining a first mean brightness anchor value of a first window array of the layer of interest mask;
determining a second mean brightness anchor value of a second window array of the layer of interest mask;
setting a first set of binary codes of the first window array;
setting a second set of binary codes of the second window array;
determining a hamming distance between the first set of binary codes and the second set of binary codes;
determining a cost volume based on the hamming distance;
resampling a vertical cost based on a vertical ordinal direction the cost volume;
resampling a horizontal cost based on a horizontal ordinal direction the cost volume;
determining an all-in-focus layer based on the vertical cost and the horizontal cost;
determining an out-of-focus layer based on the vertical cost and the horizontal cost; and
determining a depth of the all-in-focus layer and out-of-focus layer.

2. The method of claim 1, further comprising semantic partitioning of the cost volume.

3. The method of claim 1, further comprising edge a filtering the all-in-focus layer.

4. The method of claim 3, further comprising smooth filtering the out-of-focus layer.

5. The method of claim 4, further comprising recombining the edge filtered ail-in-focus layer and the smooth filtered out-of-focus layer.

6. The method of claim 1, further comprising decoupling a spatial domain and a depth domain of the first image and the second image.

7. The method of claim 6, further comprising estimating an all-in-focus depth of the all-in-focus layer.

8. The method of claim 7, further comprising segregating the all-in-focus layer and the out-of-focus layer.

9. A method of depth-of-field simulation, comprising:
receiving a plurality of images;
predicting a layer of interest mask of the plurality of images;
determining a plurality of mean brightness anchor values of a respective plurality of layers of interest window arrays of the layer of interest mask within a respective plurality of images;
setting a plurality of layers of interest set of binary codes of the respective plurality of layers of interest window arrays;
determining a hamming distance between plurality of layers of interest set of binary codes of the respective plurality of layers of interest window arrays;
determining a cost volume based on the hamming distance;
resampling a vertical cost based on a vertical ordinal direction the cost volume;
resampling a horizontal cost based on a horizontal ordinal direction the cost volume;
determining an all-in-focus layer based on the vertical cost and the horizontal cost;
determining an out-of-focus layer based on the vertical cost and the horizontal cost; and
determining a depth of the all-in-focus layer and out-of-focus layer.

10. The method of claim 9, further comprising semantic partitioning of the cost volume.

11. The method of claim 9, further comprising edge filtering the all-in-focus layer.

12. The method of claim 11, further comprising smooth filtering the out-of-focus layer.

13. The method of claim 12, further comprising recombining the edge filtered all-in-focus layer and the smooth filtered out-of-focus layer.

14. The method of claim 9, further comprising decoupling a spatial domain and a depth domain of the plurality of images.

15. The method of claim 14, further comprising estimating an all-in-focus depth of the all-in-focus layer.

16. The method of claim 15, further comprising segregating the all-in-focus layer and the out-of-focus layer.

* * * * *